United States Patent
Jarman et al.

(10) Patent No.: US 9,625,914 B2
(45) Date of Patent: Apr. 18, 2017

(54) METHOD FOR CONFIGURING A VORTEX FLOW CONTROL DEVICE

(71) Applicant: Hydro International plc, Clevedon (GB)

(72) Inventors: Daniel Stuart Jarman, Somerset (GB); Robert Yaw Gyamfi Andoh, South Portland, ME (US); Jeremy Paul Lecornu, Somerset (GB); Kwabena Osei, South Portland, ME (US)

(73) Assignee: Hydro International plc, Clevedon (GB)

( * ) Notice: Subject to any disclaimer, the term of this patent is extended or adjusted under 35 U.S.C. 154(b) by 75 days.

(21) Appl. No.: 14/418,716

(22) PCT Filed: Jul. 25, 2013

(86) PCT No.: PCT/GB2013/051987
§ 371 (c)(1),
(2) Date: Jan. 30, 2015

(87) PCT Pub. No.: WO2014/020314
PCT Pub. Date: Feb. 6, 2014

(65) Prior Publication Data
US 2015/0268667 A1    Sep. 24, 2015

(30) Foreign Application Priority Data
Aug. 2, 2012 (GB) .................................. 1213721.2

(51) Int. Cl.
*E03F 5/10* (2006.01)
*F15C 1/16* (2006.01)
*G05D 7/01* (2006.01)

(52) U.S. Cl.
CPC ............... *G05D 7/01* (2013.01); *E03F 5/106* (2013.01); *Y10T 137/0368* (2015.04); *Y10T 137/2087* (2015.04)

(58) Field of Classification Search
CPC ..... G05D 7/01; E03F 5/106; Y10T 137/0368; Y10T 137/2087
(Continued)

(56) References Cited

U.S. PATENT DOCUMENTS

| 5,080,137 A | 1/1992 | Adams |
| 2005/0034535 A1* | 2/2005 | Sprague ................ G01F 1/3209 73/861.22 |
| 2010/0300568 A1* | 12/2010 | Faram ..................... E03F 5/106 137/810 |

FOREIGN PATENT DOCUMENTS

| GB | 2141561 A | 12/1984 |
| GB | 2 409 537 A | 6/2005 |
| GB | 2486989 A | 7/2012 |

OTHER PUBLICATIONS

Machine translatin document for GB2409537 (Jun. 2005) by Hydro Int PLC [GB].*
(Continued)

Primary Examiner — Robert Fennema
Assistant Examiner — Jigneshkumar Patel
(74) Attorney, Agent, or Firm — Honigman Miller Schwartz and Cohn LLP

(57) ABSTRACT

A method of configuring a vortex flow control device 2 comprising a vortex chamber 4, an inlet 6 and an outlet 8 arranged at one end of the vortex chamber 4, wherein the method comprises the steps of: setting a target maximum flow rate $F_{T-MAX}$ through the outlet 8 for a predetermined pressure $P_{T-MAX}$ at the inlet; setting a target vortex initiation flow rate $F_{T-VI}$ through the outlet 8 at which vortex flow within the vortex chamber 4 initiates; determining the actual
(Continued)

maximum flow rate $F_{A\text{-}MAX}$ through the outlet 8 for the predetermined pressure $P_{T\text{-}MAX}$ at the inlet 6; determining the actual vortex initiation flow rate $F_{A\text{-}VI}$ through the outlet 8; determining an error parameter E based on at least one of the actual maximum flow rate $F_{A\text{-}MAX}$ and the actual vortex initiation flow rate $F_{A\text{-}VI}$ and at least one of the target maximum flow rate $F_{T\text{-}MAX}$ and the target vortex initiation flow rate $F_{T\text{-}VI}$; comparing the error parameter E against a target condition $C_T$; and, if the error parameter E fails to satisfy the target condition $C_T$, modifying at least one characteristic of the vortex flow control device 2 so as to vary at least one of the actual maximum flow rate $F_{A\text{-}MAX}$ and the actual vortex initiation flow rate $F_{A\text{-}VI}$ so that the modified vortex flow control configuration produces a hydraulic response that more closely satisfies the target condition $C_T$.

24 Claims, 6 Drawing Sheets

(58) Field of Classification Search
USPC .......................................................... 700/282
See application file for complete search history.

(56) References Cited

OTHER PUBLICATIONS

Koplitz-Weissgerber et al: "Berechnungsverfahren fuer kreisfoermige Wirbeldrosseln // Calculation of Circular Vortex Throttles", Wasserwirtschaft, Wiesbaden, DE, vol. 71, No. 5, Dec. 30, 1981 (Dec. 30, 1981), pp. 129-132, XP009172701, ISSN: 0043-0978.
International Search Report dated Oct. 1, 2013 for Application PCT/GB2013/051987.
UK Search Report dated Aug. 28, 2012 for Application GB1213721.2.

\* cited by examiner

METHOD FOR CONFIGURING A VORTEX FLOW CONTROL DEVICE

TECHNICAL FIELD

This invention relates to a method of configuring a vortex flow control device and a vortex flow control device.

BACKGROUND

Vortex flow control devices, such as vortex valves, are used to control flow through stormwater drainage systems. For example, vortex valves are often used to regulate flow from an upper catchment area to a lower catchment area. The valves help to balance the risk of flooding between the catchment areas.

Vortex valves are particularly advantageous compared with conventional flow regulators because they have no moving parts. Furthermore, flow regulation is effected by the throttling effect produced by a vortex generated within the valve. Vortex valves can therefore provide a flow restriction which is comparable to a much smaller orifice, while being less susceptible to blockage by debris entrained by the flow.

A drawback of vortex valves is that the performance of a valve is difficult to predict. Furthermore, the performance of the valve is dependent on interrelated aspects of the geometry of the valve. It is therefore difficult to configure a vortex valve to produce desired performance characteristics over an expected range of operating conditions. Typically, the geometry of a valve having known characteristics is scaled to meet a specific operating condition. Such valves do not provide optimum performance characteristics over all operating conditions.

Therefore, there exists a need for an improved method of configuring vortex flow control devices such as vortex valves to provide improved performance characteristics.

SUMMARY

According to the present invention there is provided a method of configuring a vortex flow control device comprising a vortex chamber, an inlet and an outlet arranged at one end of the vortex chamber, wherein the method comprises the steps of:

setting a target maximum flow rate through the outlet for a predetermined pressure at the inlet;

setting a target vortex initiation flow rate through the outlet at which vortex flow within the vortex chamber initiates;

determining the actual maximum flow rate through the outlet for the predetermined pressure at the inlet;

determining the actual vortex initiation flow rate through the outlet;

determining an error parameter based on at least one of the actual maximum flow rate and the actual vortex initiation flow rate and at least one of the target maximum flow rate and the target vortex initiation flow rate;

comparing the error parameter against a target condition; and if the error parameter fails to satisfy the target condition, modifying at least one characteristic of the vortex flow control device so as to vary at least one of the actual maximum flow rate and the actual vortex initiation flow rate.

The method of configuring a vortex flow control device produces a vortex flow control device having a hydraulic response that more closely satisfies the target condition.

The error parameter may, for example, be determined based on the actual maximum flow rate and the target maximum flow rate. Alternatively, or in addition, the error parameter may be determined based on the actual vortex initiation flow rate and the target vortex initiation flow rate. The, or each, characteristic of the vortex flow control device may be modified in order to vary the error parameter such that the error parameter is expected to satisfy, or to more closely satisfy, the target condition.

The error parameter may be a characteristic of a difference between the actual maximum flow rate and the target maximum flow rate, or a difference between the actual vortex initiation flow rate and the target vortex initiation flow rate.

The error parameter may be determined as a characteristic of a difference between the actual maximum flow rate and the target maximum flow rate, and a difference between the actual vortex initiation flow rate and the target vortex initiation flow rate.

The error parameter may be a compound error comprising the sum of the magnitude, for example the absolute value or square, of the difference between the actual maximum flow rate and the target maximum flow rate and the magnitude, for example the absolute value or square, of the difference between the actual vortex initiation flow rate and the target vortex initiation flow rate.

The, or each, characteristic may be modified by a predetermined amount which corresponds to the error parameter. For example, if the error parameter is determined as a value, the, or each, characteristic may be modified by an amount which is proportional to error parameter.

The magnitude of the change of the modified characteristic may correspond to a correlation, for example a ratio, of the error parameter with respect to a previous error parameter.

The, or each, characteristic of the vortex flow control device may be a geometric characteristic of the vortex flow control device, for example a geometric characteristic which corresponds to an inlet area of the inlet, an outlet area of the outlet, or a diameter of the vortex chamber.

The, or each, characteristic of the vortex flow control device may be a respective ratio of an area of the inlet with respect to an area of the outlet; a ratio of the vortex chamber diameter with respect to a diameter of the outlet, or a diameter of the outlet.

The step of modifying at least one characteristic of the vortex flow control device may comprise the steps of:

determining a respective sensitivity parameter relating to the impact of a change of the, or each, characteristic on the actual maximum flow rate and/or the actual vortex initiation flow rate; and modifying the, or each, characteristic in accordance with the sensitivity parameter.

It will be appreciated that one, some or all of the characteristics could be modified in accordance with one or more sensitivity parameters.

The sensitivity parameter may be defined as the change of the error parameter caused by a predetermined change of the, or each, characteristic.

The steps beginning with the step of determining the actual maximum flow rate through the outlet for the predetermined pressure at the inlet, through to the step of modifying at least one characteristic of the vortex flow control device if the error exceeds target error are repeated such that the error parameter may be driven to satisfy the target condition.

The error parameter may be driven to satisfy the target condition such that at least one of the actual maximum flow rate and the actual vortex initiation flow rate is driven towards the respective target maximum flow rate or the target vortex initiation flow rate.

Wherein the method is a design method, the steps of configuring the vortex flow control device being design steps which are performed prior to fabrication of the device. Such a method may be performed using a computer.

According to a second aspect of the invention there is provided a computer configured to perform the design method.

According to a third aspect of the invention there is provided a vortex flow control device comprising a vortex chamber having a chamber diameter, an inlet having an inlet area, an outlet having an outlet area, wherein the outlet is arranged at one end of the vortex chamber, and the vortex chamber, inlet area and outlet area are configured such that, in use, the vortex initiation flow rate through the outlet is equal to, or substantially equal to, a maximum flow rate through the outlet at a predetermined pressure.

For a better understanding of the present invention, and to show more clearly how it may be carried into effect, reference will now be made, by way of example, to the accompanying drawings, in which:

DETAILED DESCRIPTION

Figure 1:
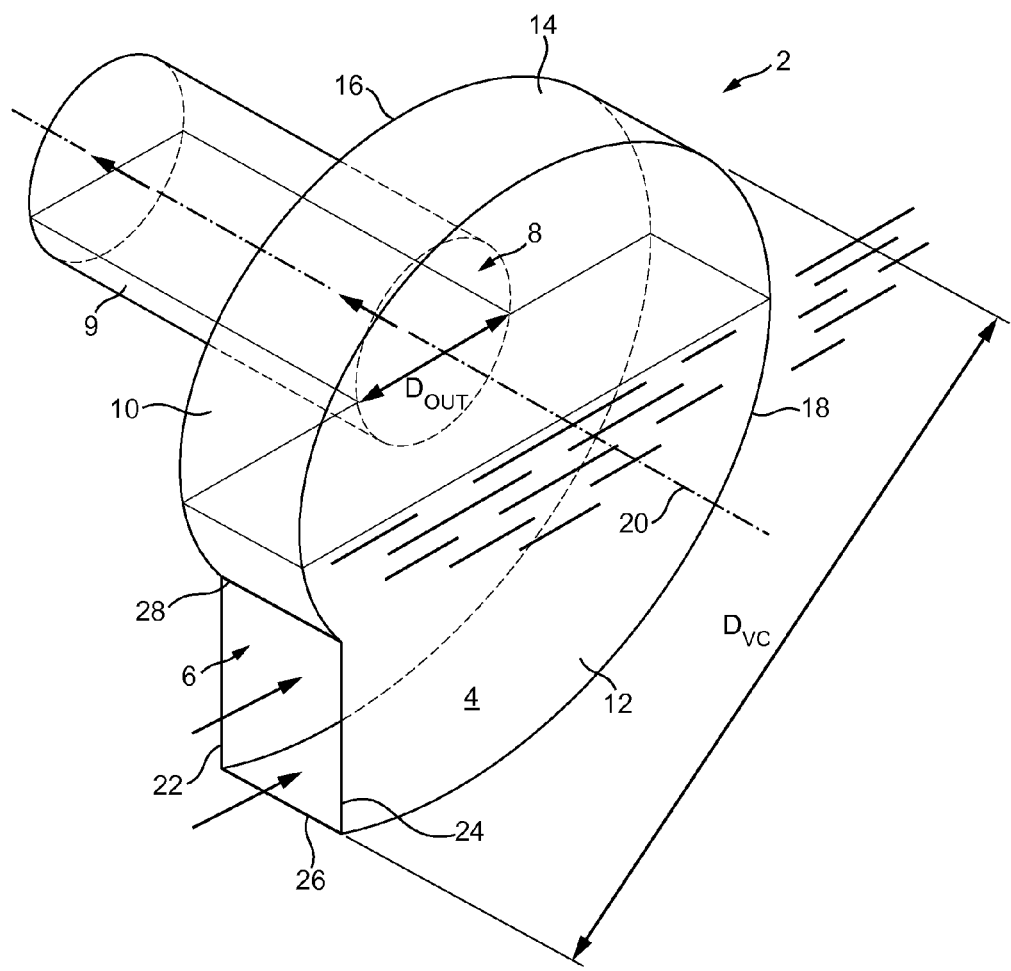
FIG. 1 shows a vortex flow control device.

FIG. 1 shows a vortex flow control device 2 comprising a vortex chamber 4, an inlet 6 and an outlet 8. The vortex flow control device 2 is connected to an outlet pipe 9 which extends horizontally away from the outlet 8. The vortex flow control device 2 may comprise part of a drainage system, for example a stormwater drainage system (not shown) for a car park, industrial or commercial building complex or similar for which prolonged periods of rainfall or periods of heavy rainfall is expected to create a substantial flow of water through the drainage system.

The vortex chamber 4 is defined by first and second opposing end walls 10, 12 and an outer wall 14. Each end wall 10, 12 has a first peripheral edge 16, 18 which extends in a spiral about a chamber axis 20, and a second peripheral edge 22, 24 which extends between opposite ends of the first peripheral edge 16, 18. Each second peripheral edge 22, 24 is substantially straight. The outer wall 14 is joined to the first peripheral edge 16 of the first end wall 10 and to the first peripheral edge 18 of the second end wall 12. The outer wall 14 extends along the entire lengths of the first peripheral edges 16, 18.

The outer wall 14 has a first edge 26 at one end and a second edge 28 at the other end. The first edge 26 is disposed radially outwardly of the second edge 28 such the outer wall 14 extends in a spiral of diminishing radius from the first edge 26 to the second edge 28. It will be appreciated that in alternative embodiments the first peripheral edge 16, 18 and the outer wall 14 need not be arranged in a spiral. For example, first peripheral edge 16, 18 may be circular.

The inlet 6 is defined by the first edge 26 and second edge 28 of the outer wall 14 and the respective second peripheral edges 22, 24 of the end walls 10, 12. The lengths of the first edge 26 and the second edge 28 are identical. The lengths of the second peripheral edges 22, 24 of the end walls 10, 12 are identical. The second peripheral edges 22, 24 are longer than the first and second edges 26, 28 such that the inlet 6 is rectangular. In alternative embodiments, the inlet 6 may be a different suitable shape, for example the second peripheral edges 22, 24 may be shorter than the first and second edges 26, 28. Alternatively, the inlet 6 may be square, or circular. The inlet 6 has a cross-sectional area, inlet area AIN, which, in the embodiment shown, is equal to the product of the length of a second peripheral edge 22, 24 of the end wall 10, 12 and the length of a first or second edge 26, 28 of the outer wall 14.

The outlet 8 comprises a circular aperture provided in the first end wall 10. The center of the outlet 8 is aligned with the chamber axis 20. The outlet 8 has an outlet diameter DOUT. The outlet 8 has a cross-sectional area, outlet area AOUT, which is the cross-sectional area of the aperture (i.e. $AOUT = \pi \times D2OUT/4$). The outlet 8 is provided in fluid communication with the outlet pipe 9.

The vortex chamber 4 has a nominal chamber diameter DVC which is defined as the distance between diametrically opposite portions of the outer wall 14. For example, the nominal chamber diameter DVC may be defined as the distance between the first edge 26 and a portion of the outer wall 14 which is diametrically opposite the first edge 26. Alternatively, the nominal chamber diameter DVC may be defined as the distance between the second edge 28 and a portion of the outer wall 14 which is diametrically opposite the second edge 28. The nominal chamber diameter DVC may be further defined as a diameter across other sections of the chamber 4 or as a mean diameter of the vortex chamber 4 through a predetermined angular segment, for example a segment extending through 90, 180 or 360 degrees. The nominal chamber diameter DVC may be defined as the effective diameter of the principle dimension of the volute In embodiments in which the vortex chamber 8 is not cylindrical, for example the vortex chamber is frusto-conical, an average (e.g. mean) diameter of the chamber may be defined as the nominal chamber diameter DVC.

It will be appreciated that other suitable definitions of the inlet area AIN, the outlet area AOUT and the nominal chamber diameter DVC may be used. The inlet area AIN and the nominal chamber diameter DVC may be defined in relation to the outlet area AOUT or the outlet diameter DOUT.

The vortex flow control device 2 in the embodiment shown is installed with the inlet 6 below the outlet 8.

In use, water flows into the vortex chamber 4 through the inlet 6. The water enters the vortex chamber 4 in a direction which is tangential to the chamber axis 20, and accumulates within the vortex chamber 4. When the level of the water within the vortex chamber 4 reaches the outlet 8, the water is discharged through the outlet 8 along the outlet pipe 9.

Figure 3:
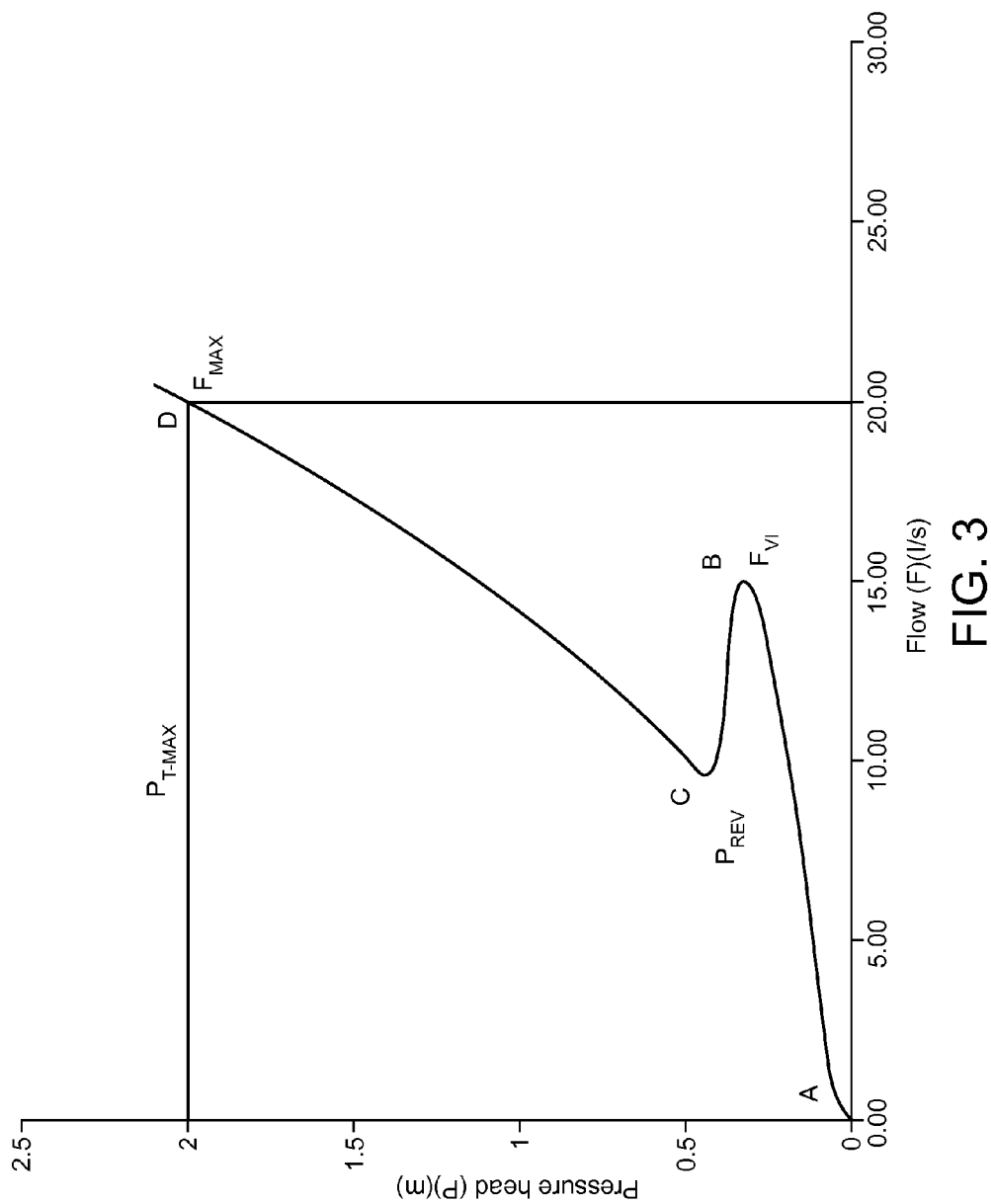
FIG. 3 is a graph depicting the performance characteristic of a vortex flow control device.

The performance characteristic of the vortex flow control device 2 is shown in FIG. 3. The performance characteristic is depicted as a plot of pressure P at the inlet 6, which may be defined as a pressure head in meters (m), or other suitable measure, against the rate of flow F through the outlet 8, which may be defined as a volume flow rate in liters per second (l/s), or other suitable measure.

Under normal flow conditions, the flow rate F through the outlet 8 is such that the level of water within the vortex chamber 4 remains below the top of the outlet 8, as shown in FIG. 1 and as indicated between points A and B of FIG. 3.

As the pressure P at the inlet 6 increases, the volume of water flowing into the vortex chamber 4 increases. This is expected to occur following a period of prolonged or heavy rainfall. The increase in flow rate at the inlet 6 causes a coherent vortex motion to initiate within the vortex chamber 4. The vortex motion introduces inertial and turbulent losses within the flow which throttle flow through the vortex flow control device 2. The flow rate at which a vortex initiates within the chamber 4 is the vortex initiation flow rate FVI indicated by point B of FIG. 3. The vortex initiation flow rate FVI is dependent on the size of the inlet area AIN, the outlet area AOUT and the nominal chamber diameter DVC The strength of the vortex is dependent on the pressure P at the inlet 6. As the pressure at the inlet 6 increases, the strength of the vortex increases. Consequently, the throttling effect of the vortex is more pronounced, which further reduces the flow rate through the outlet 8. This phenomenon is indicated between points B and C in FIG. 3.

Figure 2:
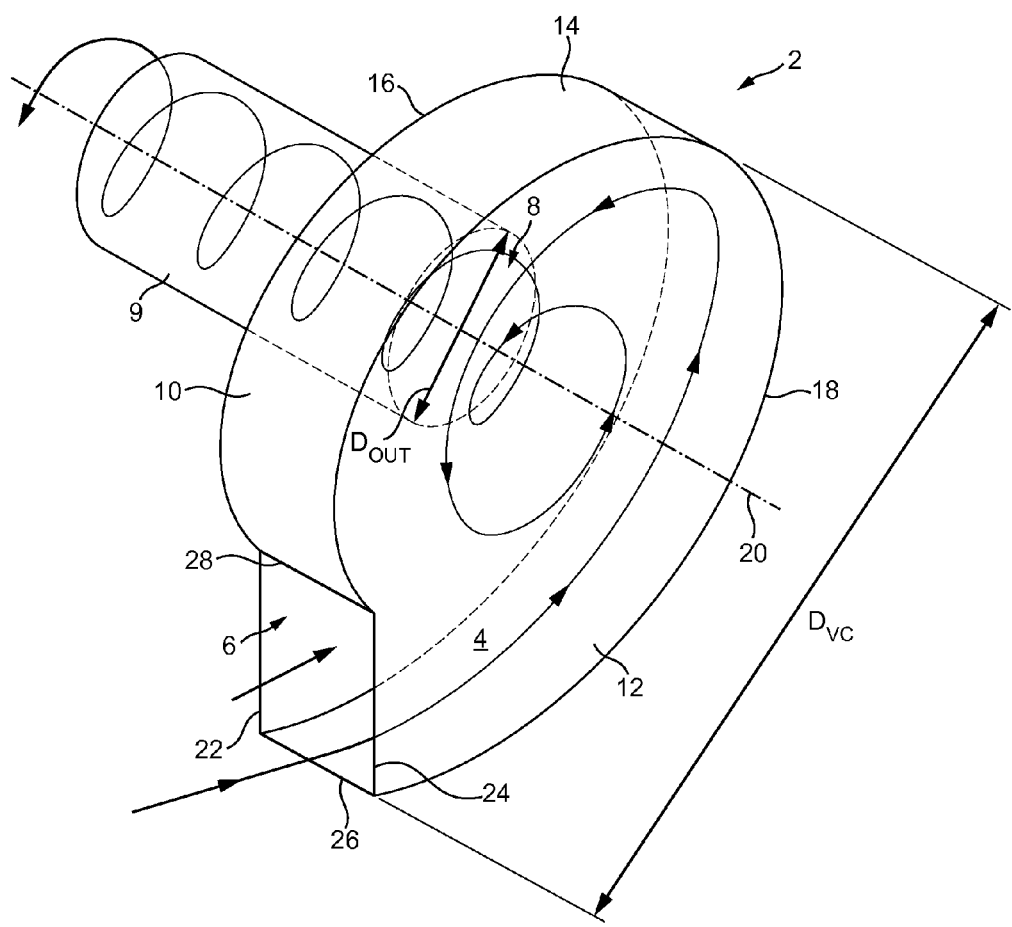
FIG. 2 shows the vortex flow control device shown in FIG. 1 when operating with a vortex within the vortex chamber.

Once the level of water at the inlet 6 reaches a level at which the vortex chamber 4 is flooded, the tangential flow of the water into the chamber 4 generates a stable vortex flow regime within the chamber 4, as shown in FIG. 2. Full formation of the vortex is indicated by point C in FIG. 3. The pressure at which this occurs is the reversal pressure PREV. This is shown as point C in FIG. 3. As the pressure at the inlet 6 increases above the reversal pressure PREV, the flow rate F through the outlet 8 increases. This is indicated between points C and D in FIG. 3. An air or water core is expected to form at the center of the vortex, which is coincident with chamber axis 20. The air or water core acts as a flow restriction which further restricts flow through the outlet 8.

Point D is the maximum flow rate FMAX through the outlet 8 for a predetermined pressure PMAX. Typically, the requirements of the drainage system dictate what the maximum flow rate FMAX can be.

The performance characteristic, in particular the vortex initiation flow rate FVI, the reversal pressure PREV and the maximum flow rate FMAX, is dependent on the size of the inlet area AIN, the outlet area AOUT and the chamber diameter DVC.

Figure 4:
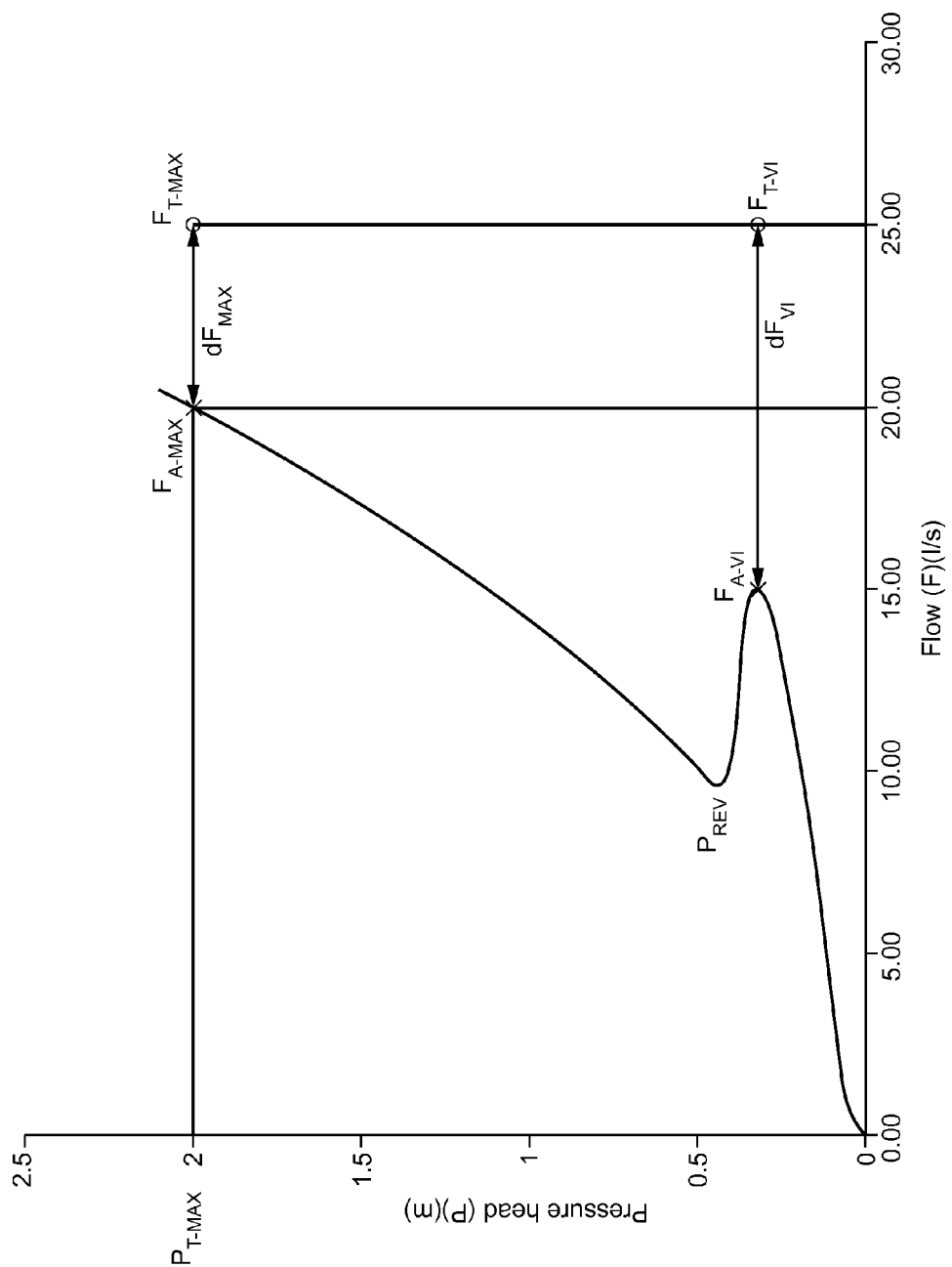
FIG. 4 is a graph depicting the performance characteristic of a vortex flow control device against a target condition.

A method of configuring a vortex flow control device 2 such as the vortex flow control device 2 shown in FIG. 1 will now be described with reference to FIGS. 4 to 6. It will be appreciated that the method may be performed by simulating the performance of a vortex flow control device 2 using a computer or other calculation or simulation means prior to fabrication of the vortex flow control device 2.

Firstly, a target maximum flow rate FT-MAX through the outlet 8 for a predetermined pressure PT-MAX at the inlet 6 is determined in accordance with constraints imposed by a drainage system or other desired operating requirements. For example, the target maximum flow rate FT-MAX may be a flow rate F which ensures that flow between upper and lower catchment areas connected by a drainage system comprising the vortex flow control device 2 is restricted to an amount which will balance the flood risk between the upper and lower catchment areas.

A vortex flow control device 2 is selected or configured having a standard geometry. The vortex flow control device 2 may be selected in accordance with specific requirements. For example, a vortex flow control device 2 having a specific diameter outlet 8 may be selected such that it matches a pipe diameter of a drainage system within which it is incorporated. Alternatively, a vortex flow control device 2 having a specific diameter vortex chamber 4 may be selected in accordance with a requirement for the vortex flow control device 2 to occupy a particular space.

The particular geometry of the vortex flow control device 2, in particular the size of the inlet area AIN, the outlet area AOUT and the chamber diameter DVC, may be determined based on prior experience. For example, a "best guess" vortex flow control device 2 which is known to provide a maximum flow rate FMAX which is similar, but not necessarily identical, to the target maximum flow rate FT-MAX may be selected.

Secondly, a target vortex initiation flow rate FT-VI, or flush-flow rate, is determined. In this embodiment, the target vortex initiation flow rate FT-VI is set equal to the target maximum flow rate FT-MAX. The advantage of a vortex initiation flow rate FVI which is equal to a maximum flow rate FMAX is that a vortex flow control device 2 can be configured to provide a flow rate which approaches a constant flow rate over a substantial portion of the expected operating pressure range P at the inlet 6 (i.e. over a range of water levels upstream of the vortex flow device 2). Providing a flow rate which approaches a constant flow rate over a broad range of conditions ensures that the storage capacity of the upper catchment and the flow capacity of the lower catchment areas are used effectively in order to reduce overall flood risk.

A performance characteristic (e.g. the hydraulic characteristic) of the vortex flow control device 2 is then determined. In particular, the actual maximum flow rate FA-MAX and the actual vortex initiation flow rate FA-VI are determined for the vortex flow control device 2. The performance characteristic may be determined by experimentation, by calculation or by simulation. For example, computational fluid dynamics may be used to evaluate the performance of the vortex flow control device 2.

The difference dFMAX between the target maximum flow rate FT-MAX and the actual maximum flow rate FA-MAX is then calculated. The difference dFVI between the target vortex initiation flow rate FT-VI and the actual vortex initiation flow rate FA-VI is also calculated.

The magnitudes of the respective differences dFMAX, dFVI are then summed to produce an error parameter E. The error parameter E may be the sum of the square of the differences dFMAX, dFVI or the sum of the absolute value of the differences dFMAX, dFVI. For example, if the actual maximum flow rate FA-MAX is 20 l/s and the target maximum flow rate FT-MAX is 25 l/s, dFMAX would be 5 l/s. If the actual vortex initiation flow rate FA-VI is 15 l/s and the target vortex initiation flow rate FT-VI is 25 l/s, dFVI would be 10 l/s. The error parameter E, calculated as the sum of the squares of the differences, would be $5^2+10^2=125$.

The error parameter E is then compared against a target condition CT which, in the present embodiment, is a predetermined maximum error parameter EMAX. Using a magnitude, for example a square of the differences, rather than the actual difference (which could be negative) ensures that an actual maximum flow rate FA-MAX which is greater than the target maximum flow rate FT-MAX does not compensate for an actual vortex initiation flow rate FA-VI being less than the target vortex initiation flow rate FT-VI. Furthermore, combining the differences into a single error ensures that the error E is a function of best fit of the combined conditions which improves the efficiency of the calculation and subsequent iterative process.

If the error parameter E exceeds the maximum error parameter EMAX, the error parameter fails to satisfy the target condition CT.

If the error parameter E fails to satisfy the target condition CT, error function gradients are calculated for each of the geometrical characteristics of the vortex flow control device 2 including the inlet area AIN, the outlet area AOUT and the chamber diameter DVC.

For example, the size of the inlet area AIN may be increased by one percent. The effect of the change in the size of the inlet area AIN on the error parameter E is then calculated. The size of the inlet area AIN may also be decreased by one percent. The effect of the change in the size of the inlet area AIN on the error parameter E is then calculated. In particular, it is determined whether an increase/decrease in the size of the inlet area AIN is expected to increase or decrease the error parameter E.

Similar calculations are performed with respect to the outlet area AOUT and the chamber diameter DVC in order to obtain error function gradients for each of these characteristics. This provides an approximation of the sensitivity of the error function to the vortex flow control configuration parameters.

At least one of the characteristics of the vortex flow control device 2 including the inlet area AIN, the outlet area AOUT and the chamber diameter DVC is then varied by a predetermined amount which would be expected to reduce the error parameter E. For example, if an increase in the size the inlet area AIN is expected to reduce the error parameter, the size of the inlet area AIN is increased. The magnitude of the change may be a predetermined standard amount, or else may be calculated as a function of the error parameter E or change in the error parameter E. For example, a generalized gradient-based optimization approach may be used to evaluate the magnitude of the change required in the configuration parameter to minimize the error parameter E to a satisfactory value. Examples of optimization approaches which could be used for this purpose are: gradient descent, truncated Newton or the generalized reduced gradient method.

In addition to using classical gradient-based optimization methods, evolutionary optimization methods may also be used exclusively, or in combination with the gradient-based optimization methods, to minimize the error parameter or provide a suitable, initial "best guess" configuration.

The performance characteristics of the vortex flow control device 2 having the new geometry are then determined, and the steps of determining the error parameter E, comparing the error parameter against the target condition CT, determining error function gradients for each of the characteristics of the vortex flow control device 2 and varying the characteristics accordingly are repeated iteratively until the error parameter E satisfies the target condition CT. Once the error parameter E satisfies the target condition CT, it is determined that the performance characteristic of the vortex flow control device 2 matches a desired performance characteristic to a satisfactory accuracy.

Figure 5:
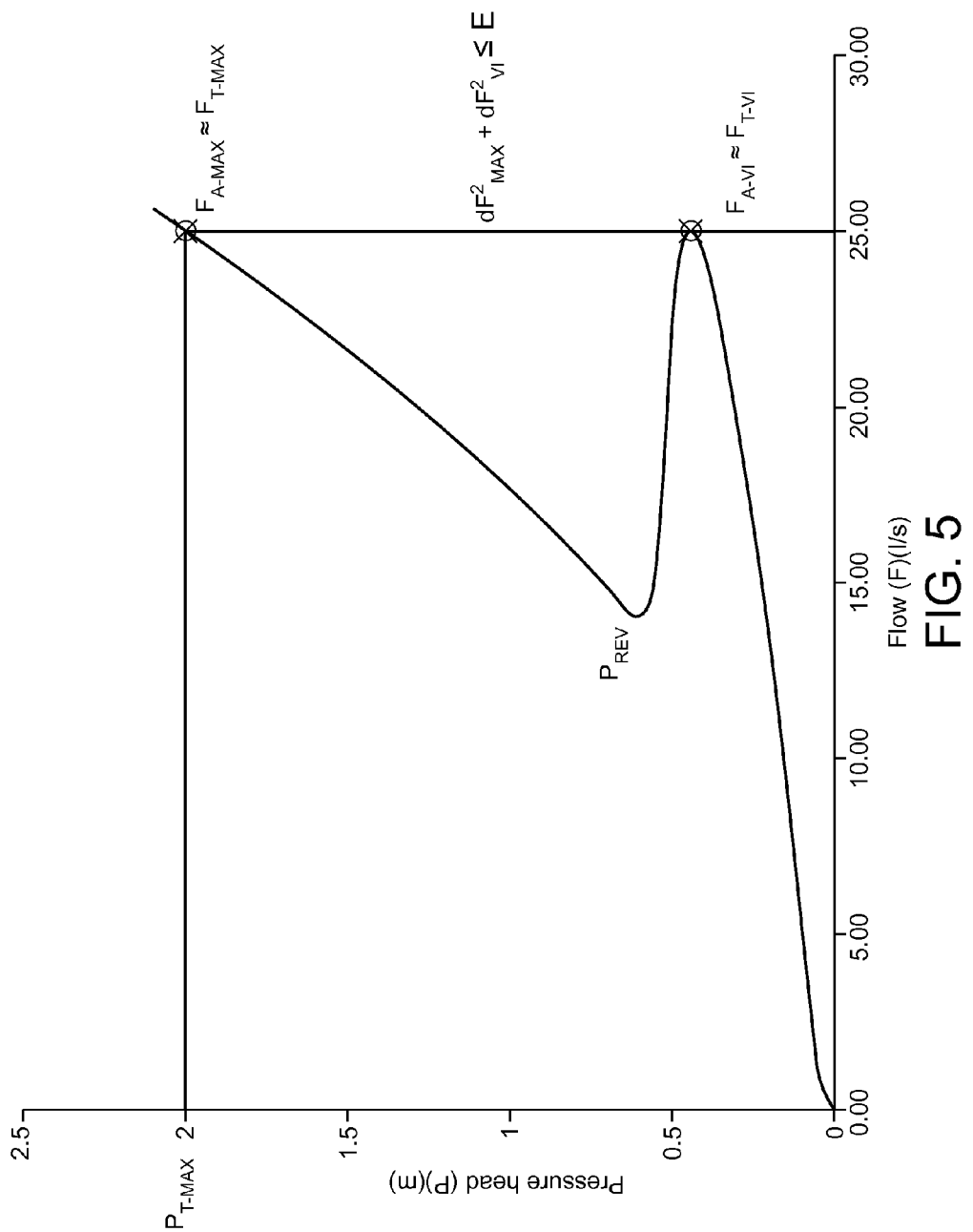
FIG. 5 is a graph depicting the performance characteristic of a vortex flow control device that has been configured to satisfy a target condition.
Figure 6:
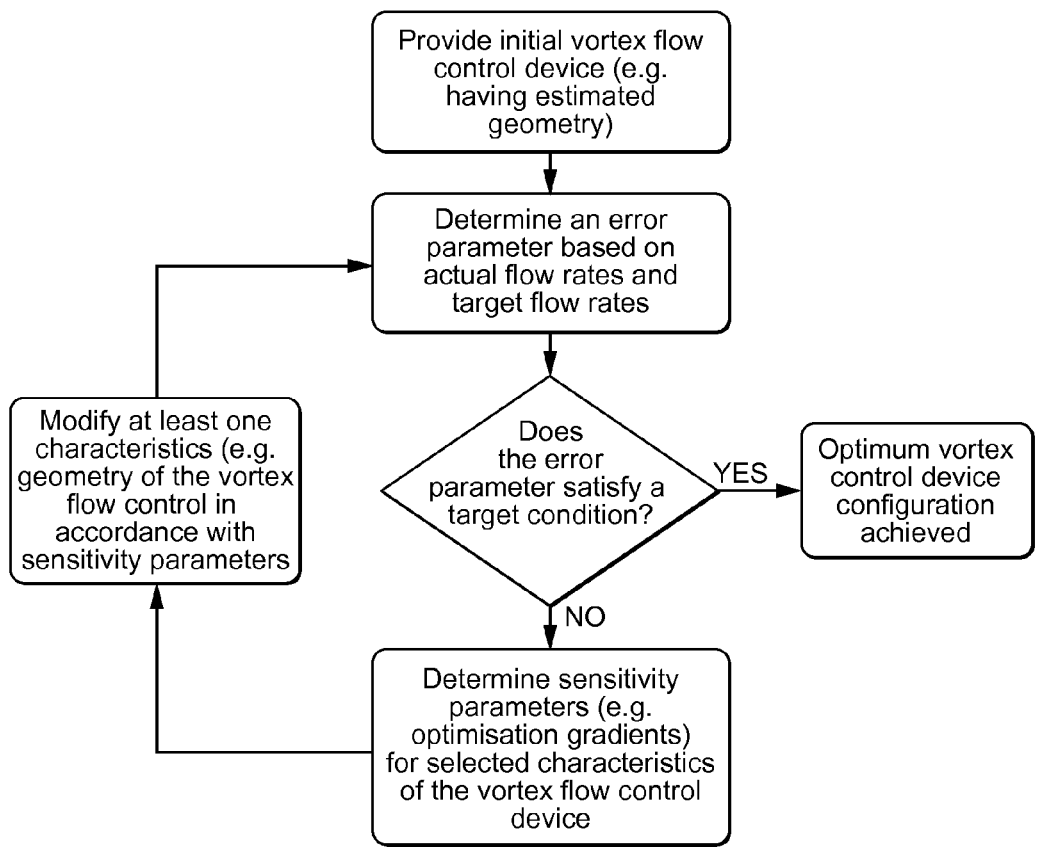
FIG. 6 is a flow chart depicting a process of configuring a vortex flow control device.

An example of the performance characteristics of a vortex flow control device 2 in which the error parameter E satisfies the target condition CT, specifically that the error parameter E does not exceed the EMAX is shown in FIG. 5. In the specific example, the target condition CT is that actual maximum flow rate FA-MAX and the actual vortex initiation flow rate FA-VI are substantially equal to the target maximum flow rate FT-MAX (i.e. E≈0).

Although the embodiment described above specifies a target vortex initiation flow rate FT-VI which is equal to the target maximum flow rate FT-MAX, it will be appreciated that the target vortex initiation flow rate FT-VI could be set independently of the target maximum flow rate FT-MAX. For example, it may be desirable to configure a vortex flow control device 2 such that the vortex initiation flow rate FVI is greater or less than the target maximum flow rate FT-MAX.

The invention claimed is:

1. A method of configuring a vortex flow control device comprising a vortex chamber, an inlet and an outlet arranged at one end of the vortex chamber, wherein the method comprises the steps of:
   setting a target maximum flow rate through the outlet for a predetermined pressure at the inlet;
   setting a target vortex initiation flow rate through the outlet at which vortex flow within the vortex chamber initiates;
   determining the actual maximum flow rate through the outlet for the predetermined pressure at the inlet;
   determining the actual vortex initiation flow rate through the outlet;
   determining an error parameter based on at least one of the actual maximum flow rate and the actual vortex initiation flow rate and at least one of the target maximum flow rate and the target vortex initiation flow rate;
   comparing the error parameter against a target condition; and
   if the error parameter fails to satisfy the target condition, modifying at least one characteristic of the vortex flow control device so as to vary at least one of the actual maximum flow rate and the actual vortex initiation flow rate;
   wherein the error parameter is determined as a characteristic of a difference between the actual maximum flow rate and the target maximum flow rate, and a difference between the actual vortex initiation flow rate and the target vortex initiation flow rate.

2. The method as claimed by claim 1, wherein the error parameter is a compound error comprising:
   a sum of a magnitude of a difference between the actual maximum flow rate and the target maximum flow rate and
   a magnitude of a difference between the actual vortex initiation flow rate and the target vortex initiation flow rate.

3. The method as claimed in claim 1, wherein the, or each, characteristic is modified by a predetermined amount that corresponds to the error parameter.

4. The method as claimed in claim 3, wherein a magnitude of the change of the modified characteristic corresponds to a correlation of the error parameter with respect to a previous error parameter.

5. The method as claimed in claim 1, wherein the, or each, characteristic of the vortex flow control device is a geometric characteristic of the vortex flow control device.

6. The method as claimed in claim 5, wherein the geometric characteristic is an inlet area of the inlet, an outlet area of the outlet, or a diameter of the vortex chamber.

7. The method as claimed in claim 6, wherein the, or each, characteristic of the vortex flow control device is defined respectively as a ratio of an area of the inlet with respect to an area of the outlet; a ratio of the vortex chamber diameter with respect to a diameter of the outlet.

8. The method as claimed in claim 1, wherein the step of modifying at least one characteristic of the vortex flow control device comprises the steps of:
determining a respective sensitivity parameter relating to the impact of a change of the, or each, characteristic on the actual maximum flow rate and/or the actual vortex initiation flow rate; and
modifying the, or each, characteristic in accordance with the sensitivity parameter.

9. The method as claimed in claim 8, wherein the sensitivity parameter is defined as the change of the error parameter caused by a predetermined change of the, or each, characteristic.

10. The method as claimed in claim 1, wherein the steps beginning with the step of determining the actual maximum flow rate through the outlet for the predetermined pressure at the inlet, through to the step of modifying at least one characteristic of the vortex flow control device if the error exceeds target error are repeated such that the error parameter is driven to satisfy the target condition.

11. The method as claimed in claim 10, wherein the error parameter is driven to satisfy the target condition such that at least one of the actual maximum flow rate and the actual vortex initiation flow rate is driven towards the respective target maximum flow rate or the target vortex initiation flow rate.

12. The method as claimed in claim 1, wherein the steps of configuring the vortex flow control device are design steps that are performed prior to fabrication of the device.

13. The method as claimed by claim 12, wherein the method is performed using a computer.

14. A computer configured to perform operations for configuring a vortex flow control device comprising a vortex chamber, an inlet and an outlet arranged at one end of the vortex chamber, the operations comprising:
setting a target maximum flow rate through the outlet for a predetermined pressure at the inlet;
setting a target vortex initiation flow rate through the outlet at which vortex flow within the vortex chamber initiates;
determining the actual maximum flow rate through the outlet for the predetermined pressure at the inlet;
determining the actual vortex initiation flow rate through the outlet;
determining an error parameter based on at least one of the actual maximum flow rate and the actual vortex initiation flow rate and at least one of the target maximum flow rate and the target vortex initiation flow rate;
comparing the error parameter against a target condition; and
if the error parameter fails to satisfy the target condition, modifying at least one characteristic of the vortex flow control device so as to vary at least one of the actual maximum flow rate and the actual vortex initiation flow rate;
wherein the error parameter is determined as a characteristic of a difference between the actual maximum flow rate and the target maximum flow rate, and a difference between the actual vortex initiation flow rate and the target vortex initiation flow rate, wherein the steps of configuring the vortex flow control device are design steps that are performed prior to fabrication of the device.

15. A method of configuring a vortex flow control device comprising a vortex chamber, an inlet and an outlet arranged at one end of the vortex chamber, wherein the method comprises the steps of:
setting a target maximum flow rate through the outlet for a predetermined pressure at the inlet;
setting a target vortex initiation flow rate through the outlet at which vortex flow within the vortex chamber initiates;
determining the actual maximum flow rate through the outlet for the predetermined pressure at the inlet;
determining the actual vortex initiation flow rate through the outlet;
determining an error parameter based on at least one of the actual maximum flow rate and the actual vortex initiation flow rate and at least one of the target maximum flow rate and the target vortex initiation flow rate;
comparing the error parameter against a target condition; and
if the error parameter fails to satisfy the target condition, determining a respective sensitivity parameter relating to the impact of a change of each of a plurality of characteristics of the vortex flow control device on the actual maximum flow rate and/or the actual vortex initiation flow rate, the characteristics comprising an inlet area of the inlet, an outlet area of the outlet, and a diameter of the vortex chamber; and
modifying at least one of the characteristics in accordance with the sensitivity parameter so as to vary at least one of the actual maximum flow rate and the actual vortex initiation flow rate.

16. The method as claimed by claim 15, wherein the error parameter is a characteristic of a difference between the actual maximum flow rate and the target maximum flow rate, or a difference between the actual vortex initiation flow rate and the target vortex initiation flow rate.

17. The method as claimed by claim 16, wherein the error parameter is determined as a characteristic of a difference between the actual maximum flow rate and the target maximum flow rate, and a difference between the actual vortex initiation flow rate and the target vortex initiation flow rate.

18. The method as claimed by claim 17, wherein the error parameter is a compound error comprising a sum of:
a magnitude of a difference between the actual maximum flow rate and the target maximum flow rate and
a magnitude of a difference between the actual vortex initiation flow rate and the target vortex initiation flow rate.

19. The method as claimed in claim 16, wherein the, or each, characteristic is modified by a predetermined amount which corresponds to the error parameter.

20. The method as claimed in claim 19, wherein a magnitude of change of the modified characteristic corresponds to a correlation of the error parameter with respect to a previous error parameter.

21. The method as claimed in claim 15, wherein the, or each, characteristic of the vortex flow control device is defined respectively as a ratio of an area of the inlet with respect to an area of the outlet; a ratio of the vortex chamber diameter with respect to a diameter of the outlet, or a diameter of the outlet.

22. The method as claimed in claim 15, wherein the sensitivity parameter is defined as a change of the error parameter caused by a predetermined change of the, or each, characteristic.

23. The method as claimed in claim 15, wherein the steps beginning with the step of determining the actual maximum flow rate through the outlet for the predetermined pressure at the inlet, through to the step of modifying at least one characteristic of the vortex flow control device if the error exceeds target error are repeated such that the error parameter is driven to satisfy the target condition.

24. A method as claimed in claim 23, wherein the error parameter is driven to satisfy the target condition such that at least one of the actual maximum flow rate and the actual vortex initiation flow rate is driven towards the respective target maximum flow rate or the target vortex initiation flow rate.

* * * * *